Jan. 11, 1955      L. W. STRAUSS      2,699,107
BALE CASE EXTENSION FOR BALERS
Filed July 9, 1951      2 Sheets-Sheet 1

INVENTOR:
L. W. STRAUSS
BY
ATTORNEYS

Jan. 11, 1955   L. W. STRAUSS   2,699,107
BALE CASE EXTENSION FOR BALERS
Filed July 9, 1951   2 Sheets-Sheet 2

INVENTOR:
L. W. STRAUSS
ATTORNEYS

United States Patent Office 2,699,107
Patented Jan. 11, 1955

2,699,107

BALE CASE EXTENSION FOR BALERS

Louis W. Strauss, Burlingame, Calif., assignor to Deere Manufacturing Co., Dubuque, Iowa, a corporation of Iowa Application July 9, 1951, Serial No. 235,776

11 Claims. (Cl. 100—192)

This invention relates to a hay baler of the type used on farms for the baling of hay, straw, and similar material. More particularly, the invention relates to improved means for controlling the weight or density of the bales formed by the baler.

In a typical baler construction, the baler has a bale case or chamber of generally rectangular cross section defined by upper and lower and opposite side walls. The density and weight of the bales are affected by the frictional resistance between the inner surfaces of the chamber walls and the material being baled. For example, in the case of light and dry material, the frictional resistance will be relatively low and if a constant volume is maintained, the bale formed of such material will be considerably lighter than a bale of material having an identical volume but a higher moisture content. Accordingly, it has heretofore been the practice to provide tensioning means for controlling the spacing between various of the chamber walls. Normally, this means comprises control means incorporated into what is known as a bale case extension. This extension is in the form of a box-like structure attached to the end of a bale chamber as a continuation thereof and having a cross sectional shape substantially like that of the bale chamber.

In a typical construction, control is accommodated by yielding means varying the spacing between the upper and lower walls of the bale case extension. For example, in its simplest form, the tensioning or control means may take the form of springs urging these two walls together, the springs being yieldable to permit separation of the walls as the bale material is forced between the walls. When it is desired to increase the weight and density of the bale, tension on the springs is increased. Conversely, tension on the springs may be decreased in conditions in which the material has a relatively higher moisture content.

Another problem encountered in the conventional bale case extension occurs because this extension has top and bottom walls hinged on the bale case and having pressure applied thereto at their outer ends. In other words, full pressure is not applied to the bale until it reaches the outer end of the extension. Since such outer end may under certain circumstances be compressed to a dimension considerably less than the fixed dimension of the bale case, the bale emerging from the bale case into the extension will be considerably compressed at its outer end. Therefore, the bale, which is already formed and tied inside the bale case, is forced through an opening smaller than the bale case. This results in further compressing the bale so that the wire or twine ties become loose.

According to the present invention, pressure is applied at both ends of the extension and the bale emerging from the bale case into the extension serves as a more satisfactory header for the bale to be formed in the bale case behind the header bale. This results in an over-all production of better shaped bales with tighter wires or twine ties. Another advantage of the improved bale case is that it is possible to increase the weight of the bales without increasing the power required to operate the baler.

Other features of the invention reside in the provision of upper and lower wall components, each of which comprises a plurality of sections, preferably each having a pair of outer sections and a center section. The outer sections are hinged at one end and pressure is applied to the other end. The center section is hinged at its opposite end and pressure is applied to that end thereof proximate to the hinged ends of the other sections.

The foregoing and other important objects and desirable features inherent in and encompassed by the invention will become apparent to those versed in the art as the disclosure progresses on the basis of the following detailed description and accompanying sheets of drawings in which Figure 1 is a perspective view of one form of the improved bale case extension shown attached to a portion of the bale case of a conventional baler;

For the purposes of brevity and clarity, reference will be had herein to the parts as having front and rear, upper and lower, etc., ends and other portions. However, this form of description is not to be understood as excluding the possibility that the parts may be otherwise arranged. Hence, the language is to be taken as descriptive and not limiting.

Figure 3:
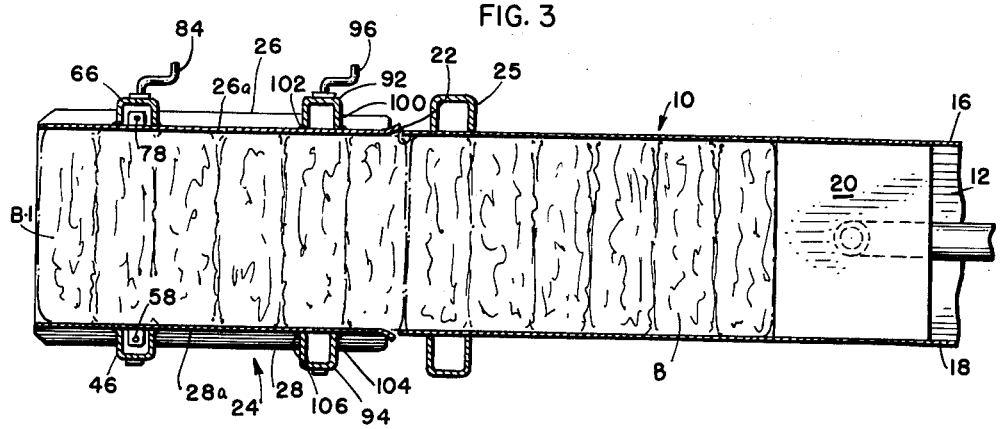
Figure 3 is a longitudinal sectional view through the bale case and bale case extension, illustrating the formation of bales therein.
Figure 4:
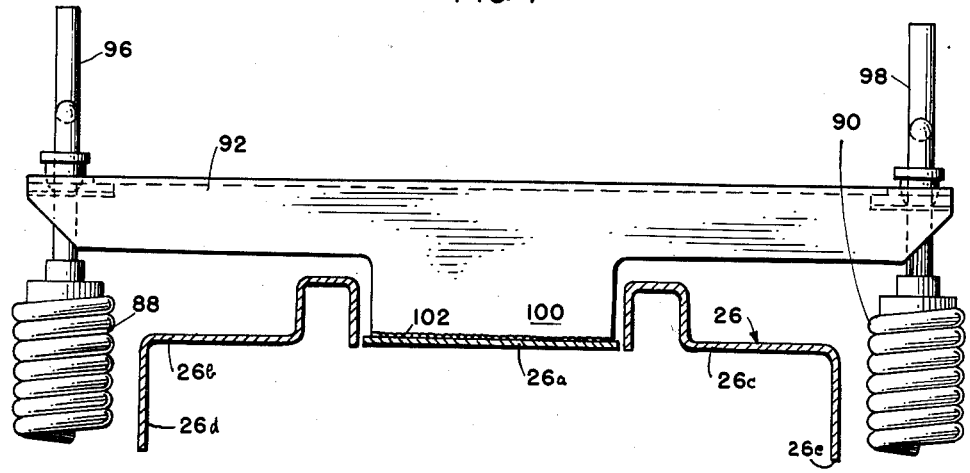
Figure 4 is a transverse sectional view taken on the line 4—4 of Figure 2.

Reference will be had first to Figure 3 for a general discussion of the bale case and bale case extension structure.

The bale case is designated generally by the numeral 10 and comprises front and rear walls 12 and 14 and top and bottom walls 16 and 18 arranged so that the bale case 10 has an elongated bale-forming chamber of generally rectangular cross section. A plunger 20 is carried within the bale case for reciprocation lengthwise thereof to accumulate and compact material into a bale B. The direction of movement of the plunger 20 on its compression stroke is indicated in Figure 3. This figure may be taken as representative of the final compression position of the plunger. It may be further assumed that the bale B is now completely formed and tied. With this assumption, it is deemed unnecessary to illustrate either the tying mechanism or the medium by which the bale is tied.

The bale case 10 has its walls arranged to define an outer end opening 22 through which successive bales ultimately emerge into a bale case extension, here designated in its entirety by the reference numeral 24. The walls 12, 14, 16, and 18 of the bale case 10 are relatively rigidly arranged and are reenforced adjacent the outer end opening 22 by collar structure 25.

The bale case extension 24 is positioned substantially as a continuation of the bale case 10 and has its inner end open and alined with the end opening 22 of the bale case. There is illustrated in the bale case extension a bale B¹, which bale has been previously formed and which serves as a header during the formation of the bale B. From this it will be seen that the operation resulting in the formation of a third bale to the right of or behind the bale B will result ultimately in the discharge of the bale B¹ through the left-hand or outer end of the bale case extension 24. In short, each previously formed bale serves as a header for a successively subsequent bale. To this extent, the functioning of the baling mechanism may be considered largely conventional.

The bale case extension 24 comprises generally upper wall means 26 and lower wall means 28. The upper wall means comprises a plurality of sections, here preferably three in number and consisting of a central section 26a flanked at each side by parallel outer or side sections 26b and 26c. The lower wall means 28 comprises a similar plurality of sections, preferably including a central section 28a flanked by side sections 28b and 28c.

The side sections 26b and 26c of the upper wall means 26 respectively include depending side flanges 26d and 26e. Similar but upstanding side flanges 28d and 28e are formed respectively on the side sections 28b and 28c of the lower wall means 28. In general, the sections 26a, 26b, and 26c may be considered flexible extensions of the top wall 16 of the bale case 10. The same may be said with respect to the bottom wall 18 of the bale case 10 and the sections 28a, 28b, and 28c. The flanges 26b and 28b are in longitudinal alinement with the front wall 12 of the bale case; and the flanges 26e and 28e are in longitudinal alinement with the rear wall 14 of the bale case.

The lower wall means 28 is flexibly related to the bale case 10 by hinge or pivot means comprising a pair of coaxial pivots 30 (only one of which appears in the drawings, but the other of which will be understood), comprising on each side section of the lower wall means 28 a strap 32 hooked over a transverse pivot pin 34 at the lower outer end of the bale case 10. The upper portion of the outer end of the bale case 10 carries second pivot means 36, each of the side sections 26b and 26c including a strap 38 that pivotally interconnects with a pivot pin 40 on the bale case. As in the case of the lower pivot means 30, there is a similar construction at the other upper side of the bale case 10. The side section 28c is braced relative to the bale case 10 by means of a diagonal brace 42 connected at its upper end to the pivot pin 40 and connected at its lower end by a pin or bolt 44 to the side flange 28e. A similar brace is present but is not shown at the other side of the bale case extension. Assuming that there would always be a bale in the bale case extension, the diagonal braces 42 could well be omitted.

Figure 5:
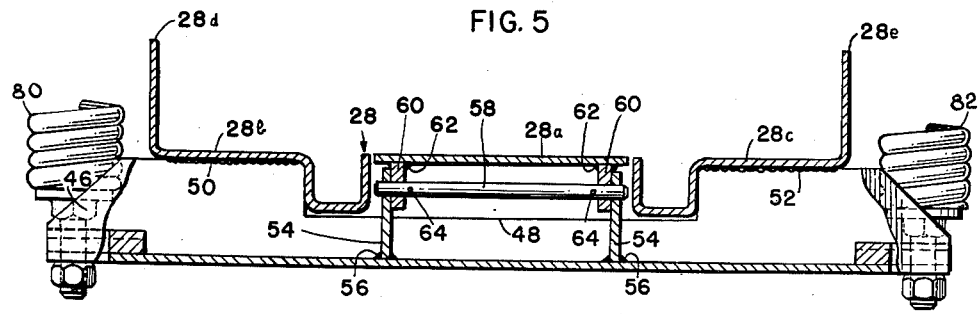
Figure 5 is a transverse sectional view taken on the line 5—5 of Figure 2.

Figure 5 best shows the interconnection between the center section 28a and its companion side sections 28b and 28c. This construction includes a transverse channel member 46 cut out at 48 to span the center section 28a and welded at each of its opposite sides at 50 and 52 respectively to the sections 28b and 28c. Two transversely spaced ears 54 are welded at 56 to and rise from an intermediate portion of the channel to carry a transverse pivot rod 58. The proximate portion of the center section 28a has thereon a pair of ears 60 apertured to receive the pivot rod 58, whereby the general result is that the center section 28a is hinged at 58 at its outer end to the outer end portion of the side sections 28b and 28c. The ears 60 are preferably welded at 62 to the center section 28a. Retaining pins 64 may be utilized to secure the position of the pivot rod 58.

Figures 1, 2:
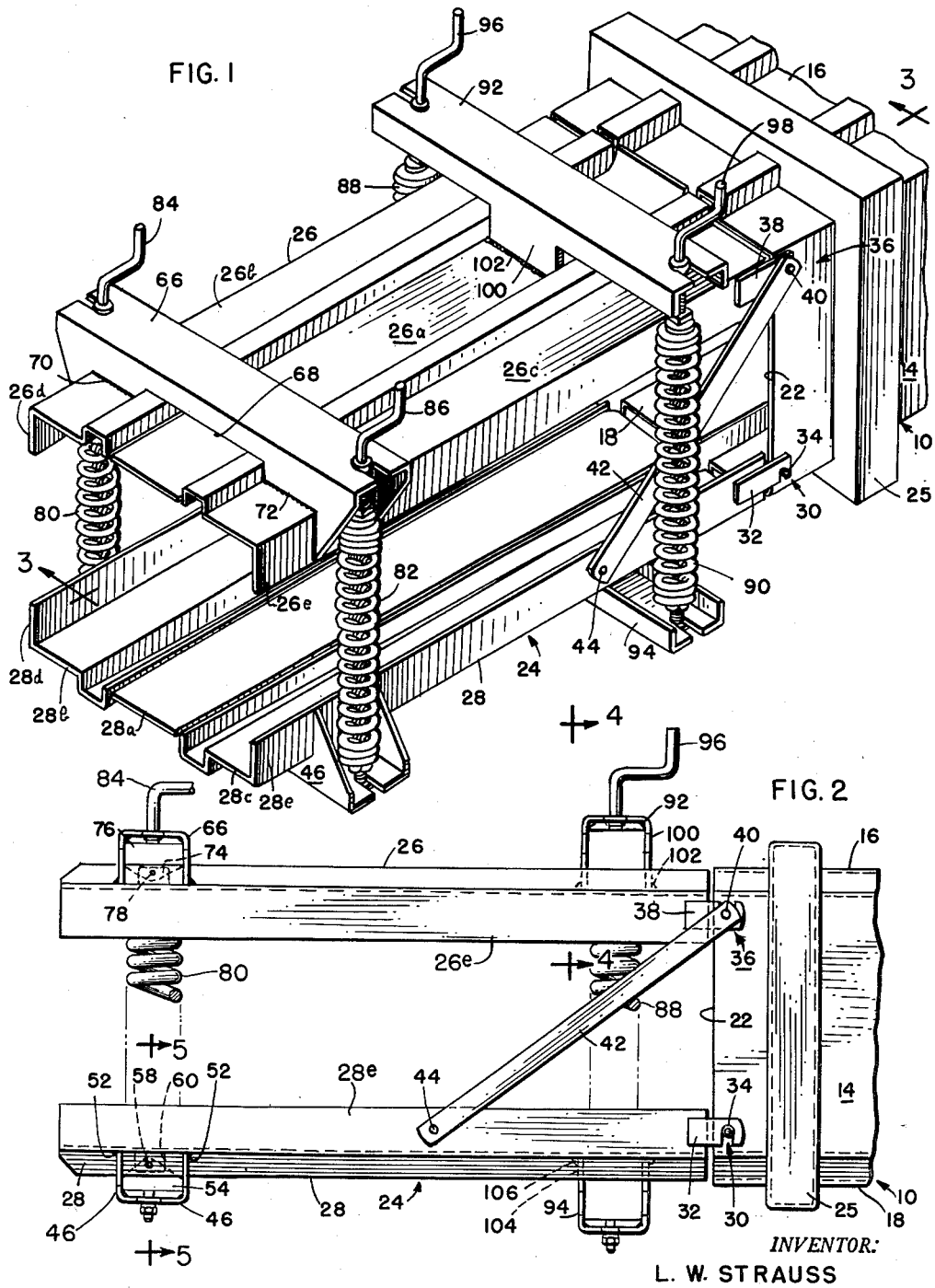
Figure 2 is a side elevational view of the improved bale case extension, with the near set of springs removed.

The interconnection between the upper center section 28a and its flanking side sections 26b and 26c is similar to that just described. The upper construction includes a transverse member 66 that is similar but inverted with respect to the lower transverse member 46. The upper member is cut out at 68 to span the center section 26a and it has its outer portions welded at 70 and 72 respectively to the side sections 26b and 26c. Cooperating ears 74 and 76 and a transverse pivot rod 78 (Figure 2) complete the hinging of the center section 26a relative to its companion side sections 26b and 26c.

The opposite outer ends of the lower transverse member 46 project respectively outwardly beyond the side flanges 28d and 28e. Similarly, the outer ends of the upper member 66 project respectively beyond the upper side flanges 26d and 26e. The proximate outer ends of the upper and lower members 66 and 46 are interconnected by yielding pressure means in the form of an adjustable tension spring 80. Similar means in the form of a spring 82 interconnects the proximate outer ends of the members 46 and 66 at the other side of the bale case extension 24. The springs are respectively adjustable by any convenient means, here shown as comprising crank screws 84 and 86. By means of the pressure means 80—82, compressive pressure is applied to the entire outer end of the bale case extension 24, drawing the outer ends together relative to the bale case 10 at least about the upper hinge pivot 36. If the braces 42 are omitted, the compressive force will be relative to the bale case about both pivots 36 and 30.

Compressive forces are applied to the inner ends of the wall means 26 and 28 by yielding pressure means in the form of springs 88 and 90 disposed respectively at opposite sides of the bale case extension and interconnected between upper and lower transverse members 92 and 94. These means are respectively adjustable by screw cranks 96 and 98.

The arrangement of the members 92 and 94 is such that pressure exerted by the springs 88 and 90 is applied only to the inner ends of the center sections 26a and 28a. For this purpose, then, the upper transverse member 92 has a depending central portion 100 that may be welded at 102 to the proximate portion of the center section 28a. The lower member 24 may be similarly constructed, having a central portion 104 (Figure 2) welded at 106 to the inner portion of the lower center section 28a. The clearance afforded by the extension of the central portion 100 beyond the main body of the member 92 enables the outer end portions of the member 92 to clear the upper side sections 26b and 26c. The same result obtains relative to the lower wall means 28.

On the basis of the foregoing description, it will be seen that in operation, the outer springs 80 and 82 exert compressive forces on the bale case extension to draw the upper and lower wall means 26 and 28 together. On the other hand, the inner springs 88 and 90 operate only on the inner end portions of the center sections 26a and 28a. This construction gives considerable variety to the amount of compressive forces that may be applied at both ends of the emerging bale, as distinguished from variations in pressure at only one end of the bale according to the prior art. For example, since the outer ends of both wall means 26 and 28 move together and apart under control of the springs 80 and 82, greater pressures may be brought to bear at the outer end of the bale. At the same time, at least some pressure may be applied to the bale as it enters the bale case extension from the bale case. Of course, the springs 88 and 90 may be tightened to a considerably greater extent than those at 80 and 82, with the result that the initial force at the entrant end of the bale case extension may be made greater than that at the outer end. These variations in pressure may be adjusted according to current operating conditions. Since the variables are relatively wide, the bale case extension has great flexibility and may be readily adapted to most if not all conditions.

The various features of the invention are deemed to have been brought out in the foregoing description. Other features not specifically enumerated therein will undoubtedly occur to those versed in the art, as likewise will numerous modifications and alterations in the preferred embodiment of the invention illustrated, all of which may be achieved without departing from the spirit and scope of the invention as defined in the appended claims.

What is claimed is:

1. For a baler having a bale case including an outlet end: an elongated bale case extension positionable as a continuation of the bale case and having an inner end registrable with the outlet end of the bale case and an outer, discharge end from which bales ultimately emerge; said extension having first and second elongated compression means spaced apart across the transverse dimension of the extension and adapted to receive bale material therebetween from the bale case, at least said first means having a longitudinal center section and a pair of longitudinal side sections flanking the center section; means for hinging the side sections at their inner, bale-case-proximate ends to the bale case for movement of their outer ends relative to the center section and toward and away from the second compression means; means mounting the center section at its outer end on the outer ends of the side sections for movement of its inner end relative to the inner ends of the side sections and toward and away from the second compression means; first biasing means interconnecting the side sections and the second compression means for normally urging the outer ends of the side and center sections toward the second compression means independently of the inner ends of said side and center sections; and second biasing means acting on the inner end of the center section in a direction parallel to the action of the first biasing means for normally urging said inner end of the center section toward the second compression means relative to the inner ends of the side sections and independently of movement of the outer ends of the side and center sections.

2. For a baler having a bale case including an outlet end: an elongated bale case extension positionable as a continuation of the bale case and having an inner end registrable with the outlet end of the bale case and an outer, discharge end from which bales ultimately emerge; said extension having first and second elongated generally parallel wall means spaced apart to receive bale material therebetween, at least said first wall means being divided into a plurality of separate bale-engaging sections running lengthwise thereof and hingedly interconnected at their outer ends for movement of the inner end of one section relative to the inner end of the other section and relative to the second wall means in opposite directions toward and away from said second wall means; means for hingedly connecting the inner end of one section to the bale case for movement of the interconnected outer ends of the sections toward and away from the second wall means while the inner end of the adjacent section is free of the bale case; first biasing means normally urging portions of the interconnected outer ends of said sections in unison toward the second wall means relative to and independently of the inner ends of said sections; and second biasing means normally urging the free inner end of said adjacent section toward the second wall means relative to the bale-case-connected section and independently of said interconnected outer ends of the sections.

3. For a baler having a bale case including an outlet end: an elongated bale case extension positionable as a continuation of the bale case and having an inner end registrable with the outlet end of the bale case and an outer, discharge end from which bales ultimately emerge; said extension having first and second opposite elongated compression means spaced apart across the transverse dimension of the structure and adapted to receive bale material therebetween from the bale case, each of said compression means having inner and outer longitudinally spaced apart ends; each of said means having a longitudinal center section and a pair of longitudinal side sections flanking the center section; means for mounting both pairs of side sections at their inner ends on the bale case for movement of their outer ends toward and away from the opposite compression means; means mounting both center sections at their outer ends on the outer ends of the respective side sections for movement of their inner ends relative to the inner ends of the respective side sections and toward and away from the opposite compression means; first biasing means normally urging the outer ends of one pair of side sections and flanked center section toward the outer ends of the other pair of side sections and flanked center section; and second biasing means acting parallel to the first biasing means for normally urging the inner ends of the center sections toward each other relative to the inner ends of the respective side sections and independently of the outer ends of said side sections.

4. For a baler having a bale case including an outlet end: an elongated bale case extension positionable as a continuation of the bale case and having an inner end registrable with the outlet end of the bale case and an outer, discharge end from which bales ultimately emerge; said extension including first and second elongated, generally parallel wall means for receiving bale material therebetween from the bale case; said first wall means including a center section and a pair of flanking side sections running lengthwise thereof; means at the inner end of the extension for hinging the inner ends of the side sections to the bale case for swinging movement of their outer ends toward and away from the outer end of the second wall means; an outer cross member overlying the outer ends of the sections and having a center portion over the outer end of the center section and a pair of side portions respectively over and engaging the outer ends of the side sections, said center portion including hinge means connected to the outer end of the center section for enabling swinging movement of the inner end of said center section toward and away from the second wall means relative to the inner ends of the side sections; a pair of biasing means connecting the laterally outer portions of the first cross member to the second wall means and normally urging the outer ends of all three sections toward the second wall means; a second cross member at the inner end of the structure and having a center portion engaging the inner end of the center section and a pair of side portions respectively over but free from the inner ends of the side sections; and a second pair of biasing means connecting the laterally outer portions of the second cross member to the second wall means for normally urging said second cross member and the inner end of the center section toward the second wall means.

5. For a baler having a bale case including an outlet end: an elongated bale case extension positionable as a continuation of the bale case and having an inner end registrable with the outlet end of the bale case and an outer, discharge end from which bales ultimately emerge; said extension including first and second elongated, generally parallel wall means for receiving bale material therebetween; said first wall means including a lengthwise center section and a pair of lengthwise flanking side sections separate from each other and from the center section, said sections being movable relative to each other in directions toward and away from the second wall means; means on the structure mounting the inner ends of the side sections on the bale case for movement of their outer ends toward and away from the second wall means; an outer cross member transverse to the outer ends of the sections and having a center portion and a pair of side portions respectively over and engaging the outer ends of the center and side sections, said side portions respectively projecting laterally beyond the side sections; a pair of biasing means acting on the projecting side portions of the outer cross member and normally urging the outer ends of all three sections in unison toward the second wall means; an inner cross member at the inner end of the structure and having a center portion engaging the inner end of the center section and a pair of side portions respectively over but disengaged from and projecting laterally beyond the inner ends of the side sections; and a second pair of biasing means acting on the projecting side portions of the inner cross member for normally urging said inner cross member and the inner end of the center section toward the second wall means.

6. For a baler having a bale case including an outlet end: an elongated bale case extension positionable as a continuation of the bale case and having an inner end registrable with the outlet end of the bale case and an outer, discharge end from which bales ultimately emerge; said extension including first and second wall means running lengthwise of said structure in general parallelism to receive bale material therebetween from the bale case; said first wall means being divided into a plurality of separate longitudinally running wall sections; means for connecting the extension at its inlet end to the outlet end of the bale case; means providing a hinge on an axis transverse to the extension and interconnecting one end portion of one section and the proximate end portion of another section for movement of said end portions together toward and away from the second wall means and providing for movement of the other end portions of the sections relative to each other toward and away from the second wall means; first yielding biasing means at one end of the extension and acting on said interconnected end portions of the sections to urge said end portions simultaneously toward the second wall means; and second yielding biasing means acting parallel to the first biasing means and on one of the sections at the other end of the extension for urging said one section toward the second wall means.

7. For a baler having a bale case including an outlet end: an elongated bale case extension positionable as a continuation of the bale case and having an inner end registrable with the outlet end of the bale case and an outer, discharge end from which bales ultimately emerge; said extension including means for connecting the extension to the bale case and further having first and second wall means running lengthwise of said structure in general parallelism to each other to receive bale material therebetween from the bale case; each of said wall means being divided longitudinally into a plurality of separate sections; means arranging the sections of each wall means for movement relative to each other toward and away from the complementary sections of the other wall means; first yielding biasing means biasing a section of one wall means toward a section of the other wall means independently of other sections; and second yielding means separate from and acting parallel to the first biasing means and biasing said other sections toward each other.

8. For a baler having a bale case including an outlet end: an elongated bale case extension positionable as a continuation of the bale case and having an inner end registrable with the outlet end of the bale case and an outer, discharge end from which bales ultimately emerge; said extension including first and second wall means running lengthwise of said structure in general parallelism to receive bale material therebetween; at least one of said wall means including a longitudinal center section and a pair of longitudinal side sections; means for connecting the center section to the bale case and providing inner and outer hinges spaced longitudinally apart on transverse axes respectively at the inner and outer ends of said center section to enable movement of said center section selectively about either hinge relative to the side sections and toward and away from the other wall means; and inner and outer yielding biasing means acting in parallel directions respectively on the inner and outer ends of the center section to urge the center section toward the other wall means.

9. For an agricultural baler having an elongated bale case including an outer end from which bale material emerges, a bale case extension, comprising: an elongated box-like structure having inner and outer ends and positionable with its inner end alined with the outer end of the bale case so as to form generally a continuation of the bale case; said structure including opposite longitudinal wall means spaced apart to receive therebetween bale material as it emerges from the bale case; one of said wall means having first and second separate longitudinally running sections disposed in side-by-side relationship; means for articulately connecting the inner end of the first section to the bale case for movement of the outer end of said first section toward and away from the other wall means; means for yielding biasing the outer end of the first section toward the second wall means; means articulately supporting the outer end of the second section on the outer end of the first section for movement of the inner end of said section toward and away from the other wall means and relative to the inner end of the first section; and second yielding biasing means acting parallel to the first biasing means and on the inner end of the second section to the exclusion of the inner end of the first section for normally urging said inner end of the second section toward said other wall means.

10. For a baler having a bale case including an outlet end: an elongated bale case extension positionable as a continuation of the bale case and having an inner end registrable with the outlet end of the bale case and an outer, discharge end from which bales ultimately emerge; said extension having first and second elongated, generally parallel wall means spaced apart to receive bale material therebetween from the bale case, at least said first wall means being divided into a plurality of separate bale-engaging sections running lengthwise thereof, and one of said sections being hingedly mounted at both its inner and outer ends for movement relative to other of said sections in directions toward and away from the second wall means; and yielding biasing means acting on said one section and effective to urge either end thereof relative to the other end or both ends together toward the second wall means.

11. For a baler having a bale case including an outlet end: an elongated bale case extension positionable as a continuation of the bale case and having an inner end registrable with the outlet end of the bale case and an outer, discharge end from which bales ultimately emerge; said extension having first and second elongated, generally parallel wall means spaced apart in opposed relation to receive bale material therebetween from the bale case, each of said wall means being made up of wall portions articulately interconnected on parallel axes so that a wall portion of each wall means is movable relative to other wall portions of the same wall means and toward and away from opposed wall portions of the other wall means; and a plurality of parallel, longitudinally spaced and separate yielding biasing means interconnecting wall portions of the first wall means to opposed wall portions of the second wall means and normally urging said wall portions individually toward each other for obtaining bale-compressing pressures in a plurality of localized areas at each of the opposite sides of the bale material.

References Cited in the file of this patent

UNITED STATES PATENTS

| | | |
|---|---|---|
| 2,411,467 | Russell | Nov. 19, 1946 |
| 2,470,278 | West et al. | May 17, 1949 |
| 2,596,872 | Skromme | May 13, 1952 |